(12) United States Patent
Idan

(10) Patent No.: US 8,844,906 B2
(45) Date of Patent: Sep. 30, 2014

(54) VEHICLE LIFTING SYSTEM

(76) Inventor: Moshe Idan, Modiin Ilit (IL)

( * ) Notice: Subject to any disclaimer, the term of this patent is extended or adjusted under 35 U.S.C. 154(b) by 0 days.

(21) Appl. No.: 13/516,819

(22) PCT Filed: Dec. 19, 2010

(86) PCT No.: PCT/IL2010/001073
§ 371 (c)(1),
(2), (4) Date: Jul. 31, 2012

(87) PCT Pub. No.: WO2011/077431
PCT Pub. Date: Jun. 30, 2011

(65) Prior Publication Data

US 2012/0313061 A1 Dec. 13, 2012

Related U.S. Application Data

(60) Provisional application No. 61/288,344, filed on Dec. 21, 2009.

(51) Int. Cl.
| | | |
|---|---|---|
| B21F 9/00 | (2006.01) | |
| B66F 3/00 | (2006.01) | |
| B60P 3/325 | (2006.01) | |
| B60R 15/00 | (2006.01) | |
| B60J 7/00 | (2006.01) | |
| B60S 9/10 | (2006.01) | |
| B60S 9/04 | (2006.01) | |
| F16M 13/02 | (2006.01) | |

(52) U.S. Cl.
CPC ..... B60S 9/10 (2013.01); B60S 9/04 (2013.01)
USPC ........................ 254/423; 296/156; 296/193.04

(58) Field of Classification Search
USPC .............................. 254/243; 296/156, 193.04
See application file for complete search history.

(56) References Cited

U.S. PATENT DOCUMENTS

| | | | | |
|---|---|---|---|---|
| 3,709,467 | A | | 1/1973 | Mann |
| 4,150,813 | A | * | 4/1979 | Mena ............................ 254/423 |
| 4,351,404 | A | * | 9/1982 | Igarashi ....................... 180/14.1 |
| 4,993,688 | A | | 2/1991 | Mueller |
| 5,219,429 | A | * | 6/1993 | Shelton ......................... 254/423 |
| 5,224,688 | A | * | 7/1993 | Torres et al. .................. 254/423 |
| 5,273,256 | A | * | 12/1993 | Chambers ....................... 254/45 |
| D348,966 | S | * | 7/1994 | Guyton .......................... D34/31 |
| D349,386 | S | | 8/1994 | Piebenga |
| 5,348,258 | A | * | 9/1994 | Rasmussen ............... 248/218.4 |
| 5,368,317 | A | | 11/1994 | McCombs |
| 5,465,940 | A | | 11/1995 | Guzman |
| 5,713,560 | A | | 2/1998 | Guarino |

(Continued)

OTHER PUBLICATIONS

International Preliminary Report on Patentability for PCT/IL10/01073; 9 pages; mailed Feb. 18, 2012.

*Primary Examiner* — Lee D Wilson
*Assistant Examiner* — Alvin Grant
(74) *Attorney, Agent, or Firm* — Edward Langer; Adv. and Patent Attorney

(57) ABSTRACT

A vehicle lifting system comprising a mechanism fixedly disposed within a center pillar at the side of a vehicle, for extending out of the pillar and exerting a downward force onto the surface on which the vehicle is positioned. When the force is exerted on the surface, the side of the vehicle is lifted above the surface. A control device is utilized for selectively extending the mechanism out of the pillar and retracting the mechanism back into the pillar.

21 Claims, 3 Drawing Sheets

(56) References Cited

U.S. PATENT DOCUMENTS

| | | | |
|---|---|---|---|
| 6,079,742 A * | 6/2000 | Spence | 280/766.1 |
| 6,170,847 B1 * | 1/2001 | Pham | 280/298 |
| 6,237,953 B1 | 5/2001 | Farmer | |
| 6,308,404 B1 | 10/2001 | Hirschmann | |
| 6,585,231 B1 | 7/2003 | Fratoni | |
| 6,913,248 B1 | 7/2005 | Schmitz | |
| 6,991,221 B1 * | 1/2006 | Rodriguez | 254/423 |
| 7,044,445 B1 * | 5/2006 | Crawford | 254/425 |
| 7,066,448 B2 | 6/2006 | Thurm | |
| 7,143,998 B1 | 12/2006 | Hall | |
| 7,354,067 B2 | 4/2008 | Majkrzak | |
| 7,467,684 B2 * | 12/2008 | Wang et al. | 180/282 |
| 7,722,110 B2 * | 5/2010 | McCarthy et al. | 296/156 |
| 7,922,238 B2 * | 4/2011 | Ische | 296/193.04 |
| 8,424,848 B1 * | 4/2013 | Hawkins, Jr. | 254/423 |
| 8,480,158 B2 * | 7/2013 | McCarthy et al. | 296/156 |
| 2002/0100901 A1 | 8/2002 | Topelberg | |
| 2005/0045859 A1 | 3/2005 | Williams | |
| 2005/0127343 A1 * | 6/2005 | Jackson et al. | 254/423 |
| 2006/0043352 A1 | 3/2006 | Singh | |
| 2006/0163551 A1 | 7/2006 | Coenen | |
| 2011/0291444 A1 * | 12/2011 | Ische | 296/193.04 |

\* cited by examiner

VEHICLE LIFTING SYSTEM

REFERENCE TO CO-PENDING APPLICATIONS

Priority is claimed as a 371 of international application number PCT/IL2010/001073, filed on Dec. 19, 2010; which claims priority to U.S. provisional patent application Ser. No. 61/288,344, filed on Dec. 21, 2009.

FIELD OF THE INVENTION

The present invention relates to the field of vehicles. In particular, the present invention relates to the field of tire replacing. More particularly, the present invention relates to a system of lifting a vehicle, for replacing one or more tires.

BACKGROUND OF THE INVENTION

Although replacing a flat tire is a relatively simple procedure, it can be time consuming, strenuous and even dangerous, particularly for women and the elderly, as well as for those who are inexperienced in performing the procedure. Additionally, the procedure often entails dirtying one's hands and clothing, if not performed in a careful manner. Moreover, the types of people in the categories mentioned above would often rather call a repairman or tow truck than attempt to replace the tire on their own, especially if they never performed the procedure before. This wastes additional time and adds costs to the tire replacing procedure.

The typical prior art procedure for replacing a tire entails first loosening the hubcap lug nuts, strategically positioning a car jack beneath the vehicle, close to the tire that requires replacing, and lifting at least the portion of the vehicle surrounding the tire that requires replacing, along with the tire. While the portion of the vehicle is raised in the air, the lug nuts are removed, the tire is removed, the new tire is placed in position, the lug nuts are replaced and the vehicle is lowered to the ground. The lug nuts are then tightened and the jack is removed from beneath the vehicle.

There exist several solutions to at least a portion of the problems related to replacing a tire, as mentioned above. The following patent documents describe some of these solutions, however, each one has one or more drawbacks associated therewith.

US Application No. 2005/0045859, U.S. Pat. No. 5,713,560, U.S. Pat. No. 5,224,688, U.S. Pat. No. 7,044,445, U.S. Pat. No. 5,219,429, U.S. Pat. No. 6,991,221 and U.S. Pat. No. 6,913,248 disclose vehicle lift systems comprising a plurality of jack units mounted to the frame of the vehicle. The units are preferably located adjacent to each of the wheels, such that four units are present. The systems are complex and costly to either retrofit or assemble during the manufacturing stage of the vehicle. Moreover, the units are exposed to the elements, such as pebbles and debris, which can result in their malfunctioning and/or completely breaking down.

Additional relevant patent documents include U.S. Pat. No. 6,237,953, US Application No. 2006/0043352, U.S. Pat. No. 4,993,688, as well as U.S. Pat. No. 5,465,940, U.S. Design No. 349,386, US Application no. 2006/0163551, U.S. Pat. No. 5,368,317, U.S. Pat. No. 3,709,467, U.S. Pat. No. 6,308,404, U.S. Pat. No. 7,066,448 and U.S. Pat. No. 7,354,067.

It would therefore be desirable to provide a vehicle lifting system, which overcomes at least some of the drawbacks associated with the prior art as described herein above.

SUMMARY OF THE INVENTION

Accordingly, it is a principal object of the invention to provide a vehicle lifting system that overcomes the problems related to replacing a tire in general, as well as the drawbacks associated with at least some of the existing prior art solutions.

It is an additional object of the present invention to provide a vehicle lifting system that requires little or no skill to operate.

It is still a further object of the present invention to provide a vehicle lifting system that is positioned at a location that avoids contact by debris from beneath the vehicle.

In accordance with a preferred embodiment of the present invention, there is provided a vehicle lifting system comprising: a mechanism fixedly disposed within a center pillar at the side of a vehicle, for extending out of the pillar and exerting a downward force onto the surface on which the vehicle is positioned, such that the side of the vehicle is liftable above the surface; and, a control device for selectively extending the mechanism out of the pillar and retracting the mechanism back into the pillar.

Preferably, the mechanism extends and retracts telescopically through the center pillar.

In one aspect of the vehicle lifting system the mechanism comprises a solid elongated shaft. In another aspect, the mechanism comprises a foldable and unfoldable shaft. In yet another, preferred aspect the mechanism is a piston. The mechanism is preferably a hydraulic piston, a pneumatic piston or an electric piston.

In a preferred embodiment, the mechanism is integrally manufactured within the center pillar. Alternatively, the mechanism is removably affixed within the center pillar. The mechanism is optionally retrofitted within the center pillar.

The control device is operable from the inside of the vehicle or external to the vehicle.

The control device activates the mechanism via a wireless connection or via a wire connection.

The control device is either a mechanical device or an electromechanical device.

The vehicle lifting system further comprises a lid situated at the opening of the pillar through which the mechanism extends and retracts. The lid is manually removable or openable, or removable or openable via the control device.

Additional objects and advantages of the present invention are described in detail herein below.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF THE PREFERRED EMBODIMENTS

A flat tire is an unplanned occurrence that typically arises at an inconvenient time. Replacing the tire takes time and energy, and often results in dirty hands and/or clothing. The present invention provides a vehicle lifting system for lifting a vehicle with minimal energy exertion, while reducing the possibility of getting one's hands and/or clothing dirty.

The terms, "vehicle" and "car" as used herein refer generally to an automobile with four wheels (double axle), having a single center pillar on each of its two longitudinal sides. However, automobiles having additional wheels and/or additional center pillars on each side are also included by the terms, "vehicle" and "car", mutatis mutandis.

The term, "center pillar" (also known as the B-pillar) as used herein refers to the vertical support shaft which is situated between the windshield frame (the A-pillar) and the last pillar (typically, the C-pillar). When additional wheels and/or center pillars are present, the vehicle lifting system of the present invention is positioned according to the criterion as described herein below.

The term "extending" as used herein refers to the shifting of at least a portion of the extending mechanism from within the pillar to at least partially out of the pillar.

Figure 1:
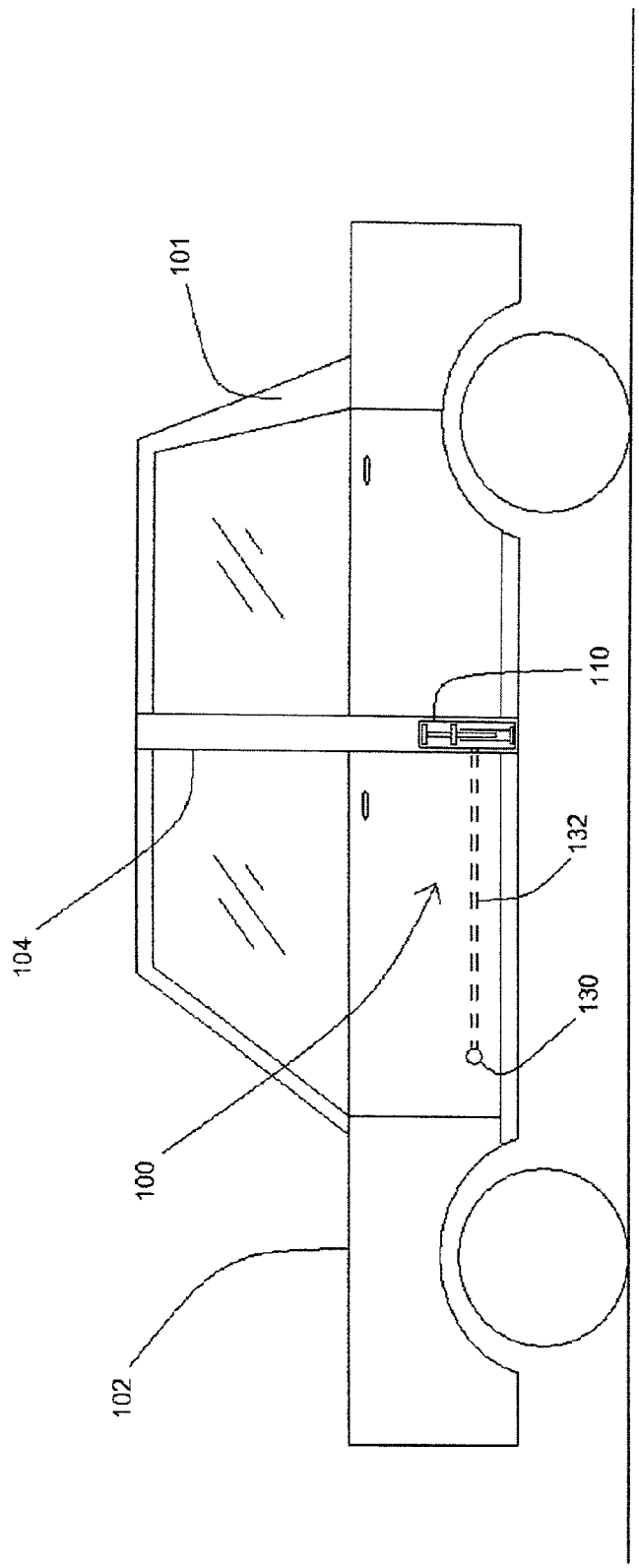
FIG. 1 shows a schematic cross-sectional side view of a first embodiment of the vehicle lifting system of the present invention, assembled within a vehicle.

A first embodiment of the lifting system of the present invention is shown schematically in FIG. 1, assembled within a vehicle, in a partially cut cross-sectional side view of the vehicle, and designated generally by reference numeral (100). System (100) comprises an extendable mechanism (110) (or, jack) fixedly disposed within the center pillar (104) at the first side (101) of vehicle (102) (wherein the vehicle is partially cut along center pillar (104) to expose system (100) within pillar (104)), and a control device (130) for selectively extending mechanism (110) out of pillar (104) and retracting mechanism (110) back into pillar (104), as described further herein below.

In a preferred embodiment, mechanism (110) is a mechanical apparatus that extends and retracts telescopically, such as a piston. Alternatively, mechanism (110) comprises a solid elongated shaft, or alternatively, mechanism (110) comprises a foldable and unfoldable shaft, for extending and retracting as described herein below. Mechanism (110) is preferably a hydraulic piston, but may be powered by any alternative means, such as pneumatically or electrically.

Mechanism (110) is preferably integrally manufactured within the typically hollow center pillar (104), but may alternatively be removably affixed therein, for instance, when repair is necessary. Alternatively, mechanism (110) is retrofittable within pillar (104).

Control device (130) is shown schematically in the figures as a switch for actuating mechanism (100), as described herein. Control device (130) may be a stand-alone switch, as shown in the figures, or alternatively, may be one component of a control panel comprising additional control features, such as speed, force, etc. In a preferred embodiment, control device (130) is situated in and operable from the interior of vehicle (102) in a location easily accessible to the driver. Alternatively, control device (130) is positioned exterior to vehicle (102) (not shown in the figures).

Control device (130) is shown in the figures in communication with mechanism (110) via a wire (or cable) connection, indicated by broken lines (132). In an alternative embodiment, control device (130) communicates wirelessly with mechanism (110). Control device (130) is preferably an electromechanical device, but may alternatively be a mechanical device for manually extending and retracting mechanism (110).

Figure 2:
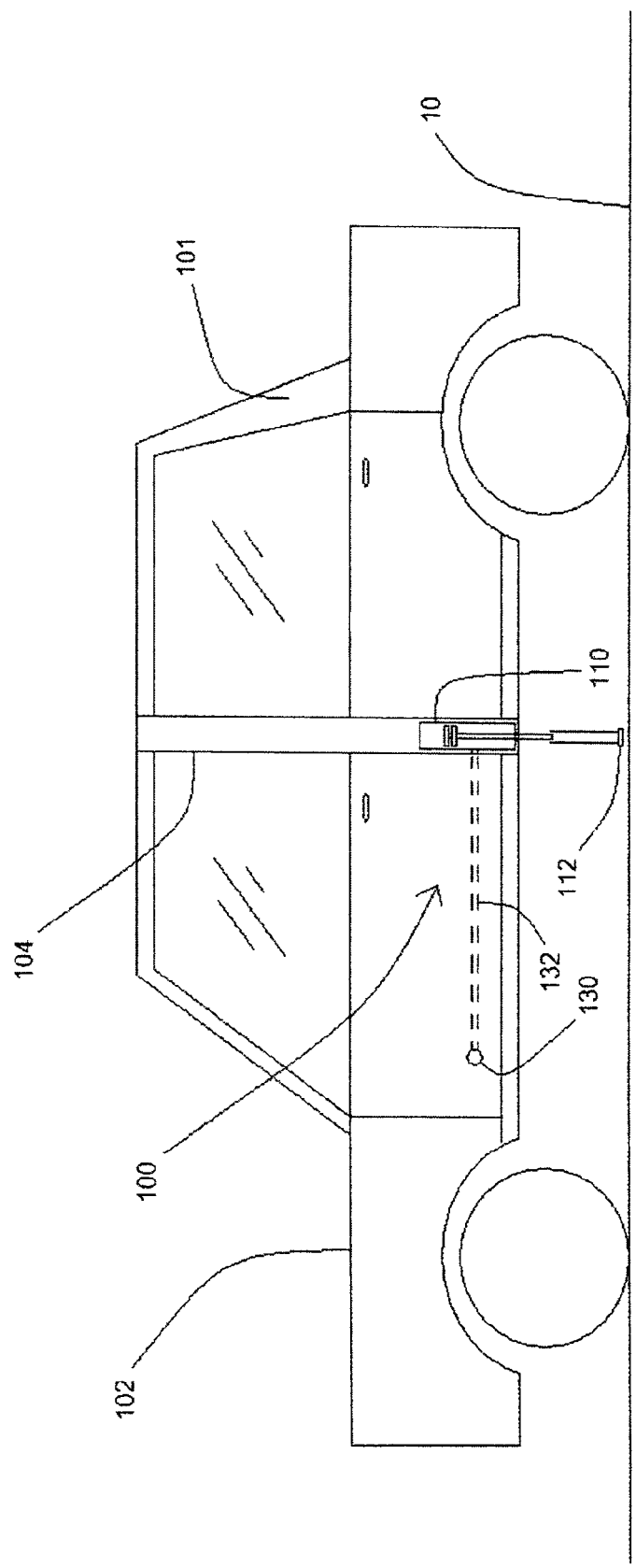
FIG. 2 shows the view of FIG. 1 with the mechanism extended towards the surface on which the vehicle is mounted; and, FIG. 3 shows the view of FIG. 2 with the vehicle lifting system of the present invention lifting a longitudinal side of the vehicle.

Referring to FIG. 2, mechanism (110) is shown partially extended out of pillar (104) such that the lower fixed base (112) at the free end of the mechanism is extended towards and nearly contacting surface (10) on which vehicle (102) is positioned.

Figure 3:
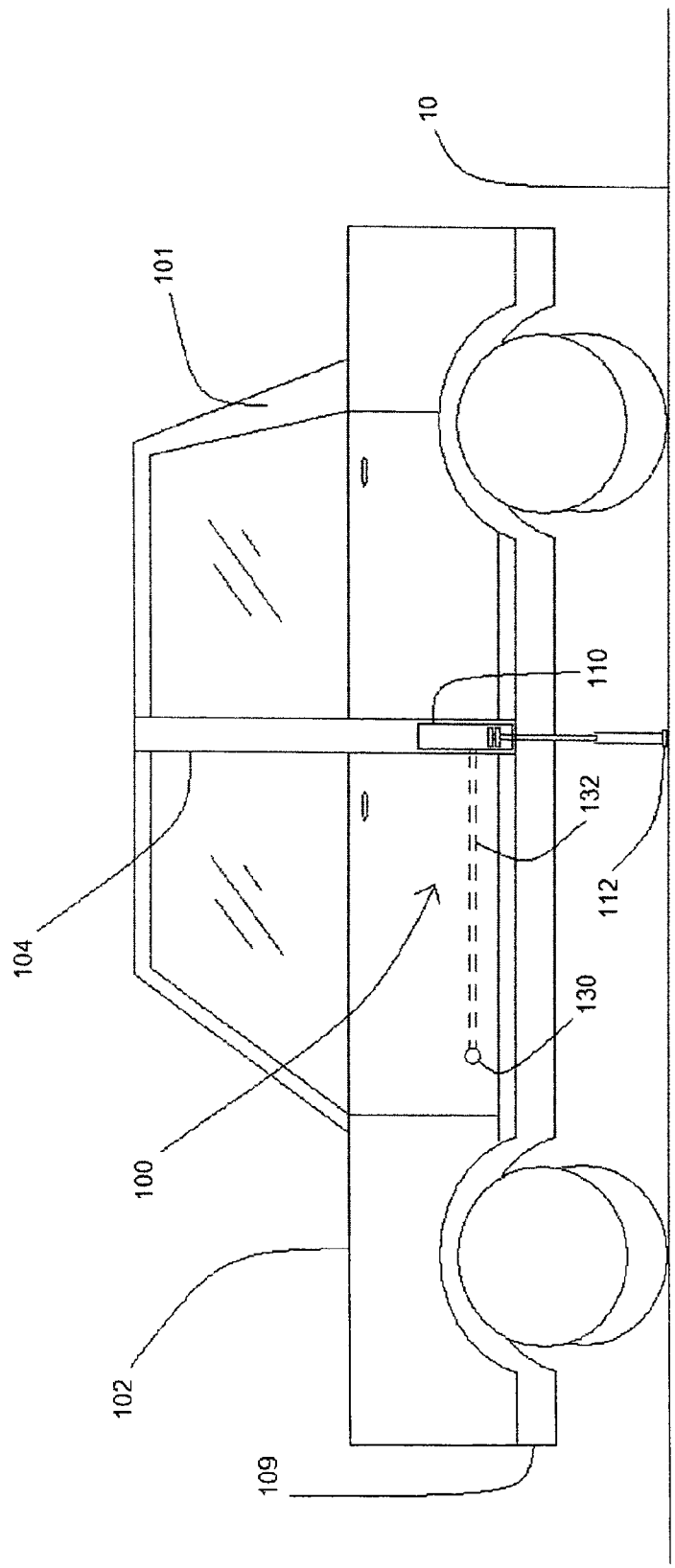

In FIG. 3, mechanism (110) is fully extended out of pillar (104), thereby applying a force large enough to lift first side (101) of vehicle (102), while maintaining second side (109) on surface (10).

It should be emphasized that, as seen in FIG. 3, both front and rear wheels are lifted essentially simultaneously, such that first side (101) is raised essentially parallel with surface (10).

Only one mechanism (110) is described herein and shown on one side (101) of vehicle (102). In a preferred embodiment, two mechanisms are situated in the vehicle, one on each side (101), (109), mutatis mutandis, as part of a single system or as two independent systems.

A protecting lid (not shown in the figures) is situated at the opening in pillar (104) at the underside of vehicle (102) through which mechanism (110) extends and retracts. The lid may be manually openable and/or removable, and/or may be openable via control device (130) either simultaneously with or independently from the movement of mechanism (130).

System (100) is operable by any person, both young and old, with little effort. Since mechanism (110) is positioned in an enclosed compartment (pillar (104)), the natural elements, including pebbles and debris are prevented from blocking and otherwise damaging mechanism (110), which would result in its malfunctioning and/or completely breaking down.

It is to be understood that the above description of the embodiments of the present invention are for illustrative purposes only, and is not meant to be exhaustive or to limit the invention to the precise form or forms disclosed, as many modifications and variations are possible. Such modifications and variations are intended to be included within the scope of the present invention as defined by the accompanying claims

The invention claimed is:

1. A durable vehicle lifting system for flat tire replacement, comprising:
   (a) a single jack mechanism fixedly disposed within a vehicle's hollow center pillar on a corresponding side of the vehicle and normally completely enclosed therewithin so as to be unexposed to flying road related pebbles or debris, said mechanism comprising:
      i) an extendable element for vertically extending down from the underside of said pillar; and
      ii) a force applier connected to the bottom of said extendable element and maintained in a solely vertical disposition, said force applier terminating with a lower, essentially planar surface-abutting base for stabilizing said vehicle while exerting a downward force onto a surface on which said vehicle is positioned, such that vehicle wheels located on the same side as said center pillar are liftable above said surface; and,
   (b) a control device for selectively extending said mechanism vertically down from the underside of said pillar and retracting said mechanism back into said pillar,
   said lifting system further comprising a lid pivotally connected to the underside of the vehicle, for releasably covering the opening of the pillar through which the mechanism extends and retracts.

2. The vehicle lifting system of claim 1, wherein the mechanism extends and retracts telescopically.

3. The vehicle lifting system of claim 1, wherein the mechanism comprises a solid elongated shaft.

4. The vehicle lifting system of claim 1, wherein the mechanism comprises a foldable and unfoldable shaft.

5. The vehicle lifting system of claim 1, wherein the mechanism is a piston.

6. The vehicle lifting system of claim 5, wherein the mechanism is a hydraulic piston.

7. The vehicle lifting system of claim 5, wherein the mechanism is a pneumatic piston.

8. The vehicle lifting system of claim 5, wherein the mechanism is an electric piston.

9. The vehicle lifting system of claim 1, wherein the mechanism is integrally manufactured within the center pillar.

10. The vehicle lifting system of claim 1, wherein the mechanism is removably affixed within the center pillar.

11. The vehicle lifting system of claim 1, wherein the mechanism is retrofitted within the center pillar.

12. The vehicle lifting system of claim 1, wherein the control device is operable from the inside of the vehicle.

13. The vehicle lifting system of claim 1, wherein the control device is operable external to the vehicle.

14. The vehicle lifting system of claim 1, wherein the control device activates the mechanism via a wireless connection.

15. The vehicle lifting system of claim 1, wherein the control device activates the mechanism via a wire connection.

16. The vehicle lifting system of claim 1, wherein the control device is a mechanical device.

17. The vehicle lifting system of claim 1, wherein the control device is an electromechanical device.

18. The vehicle lifting system of claim 1, wherein the lid is manually removable.

19. The vehicle lifting system of claim 1, wherein the lid is manually openable.

20. The vehicle lifting system of claim 1, wherein the lid is removable via the control device.

21. The vehicle lifting system of claim 1, wherein the lid is openable via the control device.

* * * * *